United States Patent
Suzuki

(10) Patent No.: US 8,208,069 B2
(45) Date of Patent: Jun. 26, 2012

(54) AUDIO PROCESSING APPARATUS, VIDEO PROCESSING APPARATUS, AND METHOD FOR CONTROLLING THE SAME

(75) Inventor: Noriaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 12/255,456

(22) Filed: Oct. 21, 2008

(65) Prior Publication Data

US 2009/0135300 A1    May 28, 2009

(30) Foreign Application Priority Data

Nov. 27, 2007  (JP) ................................ 2007-306003

(51) Int. Cl.
*H04N 9/475* (2006.01)
(52) U.S. Cl. ....................... 348/515; 348/512
(58) Field of Classification Search .......... 348/512–519, 348/192, 180
See application file for complete search history.

(56) References Cited

U.S. PATENT DOCUMENTS

| | | | | |
|---|---|---|---|---|
| 4,313,135 | A * | 1/1982 | Cooper | 348/512 |
| 6,862,044 | B2 | 3/2005 | Kariatsumari | |
| 7,212,247 | B2 * | 5/2007 | Albean | 348/515 |
| 2002/0140859 | A1 | 10/2002 | Kariatsumari | |
| 2002/0174440 | A1 | 11/2002 | Usuba | |
| 2003/0142232 | A1 | 7/2003 | Albean | |
| 2006/0012710 | A1 | 1/2006 | Sasaki | |
| 2006/0017846 | A1 * | 1/2006 | Kim | 348/515 |
| 2007/0230913 | A1 | 10/2007 | Ichimura | |
| 2007/0276524 | A1 | 11/2007 | Tokuhara | |
| 2008/0044160 | A1 | 2/2008 | Maegaki | |

FOREIGN PATENT DOCUMENTS

| | | |
|---|---|---|
| CN | 1435996 A | 8/2003 |
| CN | 1957604 A | 5/2007 |
| CN | 101047777 A | 10/2007 |
| EP | 1104179 A2 | 5/2001 |
| EP | 1619902 A2 | 1/2006 |
| JP | 08-102911 A | 4/1996 |
| JP | 2002-290932 A | 10/2002 |
| JP | 2002-344898 A | 11/2002 |
| JP | 2007-235519 A | 9/2007 |
| JP | 2007-318604 A | 12/2007 |
| WO | 01/53140 A2 | 7/2001 |

* cited by examiner

*Primary Examiner* — Michael Lee
(74) *Attorney, Agent, or Firm* — Canon USA Inc IP Division

(57) ABSTRACT

A video audio system includes an audio processing apparatus capable of processing audio signals input from a plurality of input sources and a video processing apparatus capable of displaying a video image based on a video signal input from a selected input source. The video processing apparatus executes image processing based on the selected input source type notified by the audio processing apparatus, and transmits delay time information required for the image processing. The audio processing apparatus delays an audio signal based on the delay time information transmitted from the video processing apparatus.

7 Claims, 6 Drawing Sheets

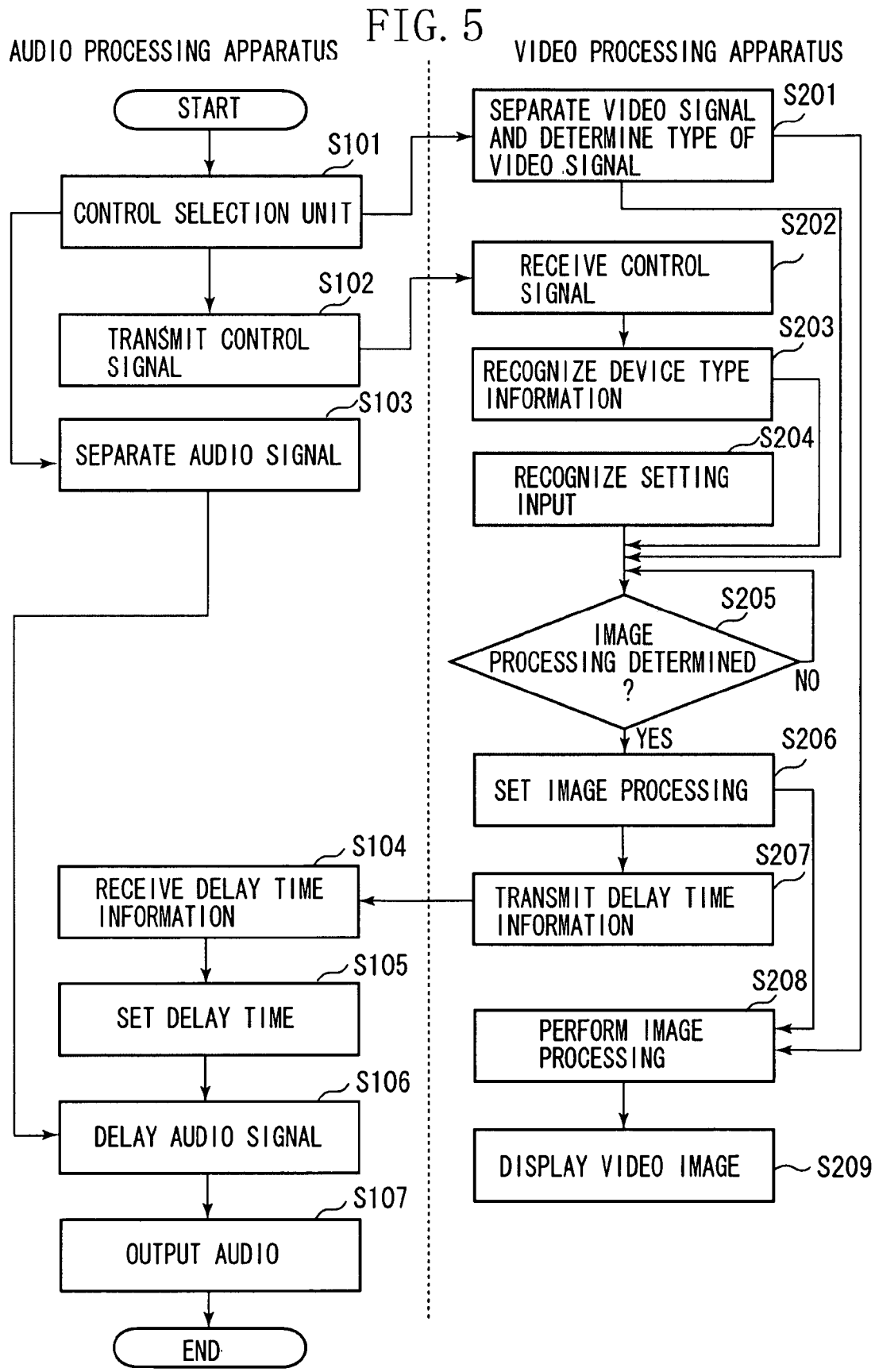

FIG. 6

| DEVICE TYPE | SIGNAL TYPE | IMAGE QUALITY SET BY USER | IMAGE PROCESSING | DELAY TIME |
|---|---|---|---|---|
| DVD PLAYER | INTERLACE | STANDARD | I/P PROCESSING SUPPORTING CINEMA MODE | 120ms |
| | | DYNAMIC | I/P PROCESSING SUPPORTING CINEMA MODE+COLOR CORRECTION | 130ms |
| | PROGRESSIVE | STANDARD | PROCESSING SUPPORTING CINEMA MODE | 100ms |
| | | DYNAMIC | PROCESSING SUPPORTING CINEMA MODE+COLOR CORRECTION | 110ms |
| GAME CONSOLE | INTERLACE | STANDARD | I/P PROCESSING SUPPORTING GAME MODE | 60ms |
| | | DYNAMIC | I/P PROCESSING SUPPORTING GAME MODE+COLOR CORRECTION | 70ms |
| | PROGRESSIVE | STANDARD | PROCESSING SUPPORTING GEME MODE | 40ms |
| | | DYNAMIC | PROCESSING SUPPORTING GAME MODE+COLOR CORRECTION | 50ms |
| OTHER DEVICES | INTERLACE | STANDARD | NORMAL PROCESSING I/P PROCESSING | 100ms |
| | | DYNAMIC | NORMAL PROCESSING I/P PROCESSING+COLOR CORRECTION | 110ms |
| | PROGRESSIVE | STANDARD | NORMAL PROCESSING | 80ms |
| | | DYNAMIC | NORMAL PROCESSING+COLOR COLLECTION | 90ms |

AUDIO PROCESSING APPARATUS, VIDEO PROCESSING APPARATUS, AND METHOD FOR CONTROLLING THE SAME

BACKGROUND OF THE INVENTION

1. Field of the Invention

The present invention relates to an audio processing apparatus and a video processing apparatus capable of communicating delay information about video display to control delay time of audio signal, and also relates to a method for controlling these apparatuses.

2. Description of the Related Art

The technology has been conventionally known that eliminates a time lag between video to be displayed and audio to be output and reproduces the synchronized video and audio in a video/audio player. Japanese Patent Application Laid-Open No. 2002-344898 discusses the following method for synchronizing video and audio. A video processing apparatus monitor sends delay time information, as a control command, caused by an intrinsic delay factor for video display to an amplifier via a serial bus. The amplifier provides a required delay time to synchronize an audio output with a video display according to the control command.

According to the method for synchronizing video and audio discussed in Japanese Patent Application Laid-Open No. 2002-344898, a time lag between video and audio is set according to the intrinsic delay factor of processing carried out in the monitor. Therefore, in a case, for example, where the image processing method changes depending on the type of an input device, sufficient synchronization is difficult to obtain.

The image processing time changes depending on the type of input video signal, such as a still image/moving image and resolution, the type of an input device, such as a game console or a digital versatile disc (DVD) player, and an image quality setting by the user. If the delay time for video display changes due to a change in image processing time, synchronization of video and audio may become insufficient when they are reproduced.

SUMMARY OF THE INVENTION

According to an aspect of the present invention, an audio processing apparatus connectable to a video processing apparatus and capable of processing audio signals input from a plurality of input sources includes a transmission unit configured to transmit a type of an input source to the video processing apparatus, a receiving unit configured to receive delay time information, from the video processing apparatus, concerning display of a video based on a video signal input from the input source, the delay time information being set according to the type of the input source, and a delay unit configured to delay an audio signal input from the input source based on the delay time information.

According to another aspect of the present invention, a video processing apparatus connectable to an audio processing apparatus and capable of processing audio signals input from a plurality of input sources includes a determination unit configured to determine a type of a video signal input from an input source and received from the audio processing apparatus, an image processing unit configured to execute image processing of the video signal based on the determined type of the video signal, a setting unit configured to set a delay time associated with the image processing, and a transmission unit configured to transmit delay time information concerning the delay time to the audio processing apparatus.

According to an exemplary embodiment of the present invention, an adaptive synchronized reproduction, where a video image and an audio are synchronized, can be realized according to various conditions, such as a type of input video signal, a type of input source, and various adjustments by the user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating processing performed by an audio processing apparatus and a video processing apparatus according to an exemplary embodiment of the present invention.

FIG. 6 is an internal data table stored in a video processing apparatus according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
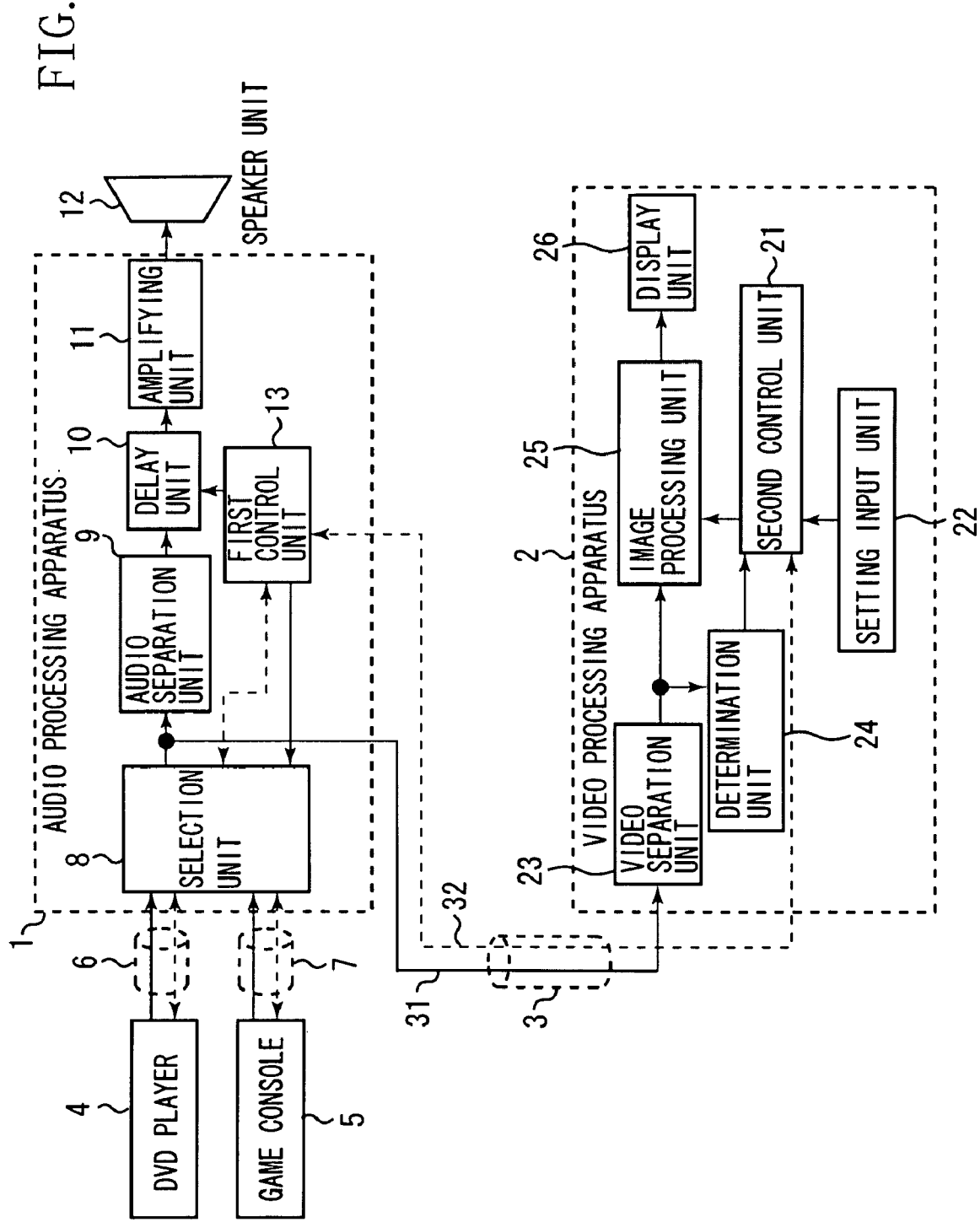
FIG. 1 is a block diagram illustrating an audio processing apparatus and a video processing apparatus according to a first exemplary embodiment of the present invention.

FIG. 1 is a block diagram illustrating an audio processing apparatus and a video processing apparatus according to a first exemplary embodiment of the present invention. An audio processing apparatus 1 and a video processing apparatus 2 are connectable to each other.

The audio processing apparatus 1 and the video processing apparatus 2 are connected via a first interface cable 3.

The audio processing apparatus 1 and a first video audio output device 4 as an input source (for example, a DVD player) are connected via a second interface cable 6. The audio processing apparatus 1 and a second video audio output device 5 (for example, a game console) are connected via a third interface cable 7.

The first, second, and third interface cables 3, 6, and 7 each include a video audio signal line 31, which transmits a multiplexed video and audio signal, and a control signal line 32 physically grouped together. More specifically, a High-Definition Multimedia Interface (HDMI) cable can be used.

The video audio signal line 31 transmits a video audio signal including a video signal and an audio signal associated with each other.

The control signal line 32 transmits a control signal including information about a device type for alternate authentication of the devices to be connected, and command information for controlling operations of the devices.

The audio processing apparatus 1 is capable of processing audio signals from a plurality of input sources and is configured as follows.

A selection unit 8 selects an input source from among a plurality of input sources and outputs a video audio signal of the selected input source under the control of a first control unit 13. At the same time, the selection unit 8 also transmits the video audio signal of the selected input source to the video processing apparatus 2.

An audio separation unit 9 extracts an audio signal from the video audio signal output from the selection unit 8, and outputs the extracted audio signal. This separation is necessary only when the input audio signal is multiplexed with the video signal.

A delay unit 10 provides a predetermined delay time on the audio signal received from the audio separation unit 9.

An amplifier 11 amplifies the audio signal output from the delay unit 10 to a level capable of driving a speaker unit 12.

The speaker unit 12 converts the amplified audio signal into audible sound.

The first control unit 13 outputs a control signal to the selection unit 8 to provide an instruction on the input source to be selected and transmits the information about a type of the selected input source to a second control unit 21 in the video processing apparatus 2. Further, the first control unit 13 receives delay information from the second control unit 21, and sets a delay time based on the delay information and outputs it to the delay unit 10.

The video processing apparatus 2 has the following configuration.

A video separation unit 23 extracts a video signal from the video audio signal output from the selection unit 8 of the audio processing apparatus 1 and outputs the extracted video signal. This separation is necessary only when the input video signal is multiplexed with the audio signal.

A determination unit 24 analyzes the video signal output from the video separation unit 23 to obtain a type of a video signal, such as resolution, a scan mode (interlace or progressive), and a moving image or a still image. The determination unit 24 determines the type of the video signal based on the result of the analysis and outputs the determination result to the second control unit 21.

An image processing unit 25 performs signal processing, such as conversion, calculation, and correction, on the video signal output from the video separation unit 23 based on the type of the input source according to instructions from the second control unit 21.

A display unit 26 displays a video image based on the video signal processed by the image processing unit 25.

A setting input unit 22 outputs image quality setting information about the video image to be displayed on the display unit 26 to the second control unit 21, which is input by a user's operation.

The second control unit 21 outputs a control signal to the image processing unit 25 for executing image processing according to the output from the determination unit 24, the setting input unit 22, and the first control unit 13 in the audio processing apparatus 1.

Operations of the audio processing apparatus 1 and the video processing apparatus 2 are described in detail below referring to a flow chart illustrated in FIG. 5.

The audio processing apparatus 1 starts its operation when the power is on. In step S101, the first control unit 13 controls the selection unit 8 to select one of the plurality of input sources and to output a video audio signal of the selected input source. The first control unit 13 selects the input source according to the instruction for selecting the connected device operated by a user. When only one device is connected to the audio processing apparatus 1, the input from the connected device is automatically selected. The video audio signal of the selected input source is output to the video processing apparatus 2, and is input to the audio separation unit 9. In step S103, the audio separation unit 9 separates an audio signal from the video audio signal. The control signal of the selected input source is input to the first control unit 13. In step S102, the first control unit 13 transmits information about the type of device of the selected input source to the second control unit 21 in the video processing apparatus 2.

When the video audio signal from the input source selected in step S101 is input to the video processing apparatus 2, then in step S201, the video separation unit 23 separates a video signal from the video audio signal and outputs the video signal to the image processing unit 25. Further, the determination unit 24 determines a type of the video signal concerning resolution, a scan mode, and a moving image or a still image. In step S202, the second control unit 21 receives the control signal transmitted from the first control unit 13 in step S102. In step S203, the second control unit 21 recognizes information about the model type contained in the control signal. In step S204, the second control unit 21 recognizes the output of the setting input unit 22. In step S205, the second control unit 21 determines optimum image processing based on the results of the setting input recognition processing (S204), the device type information recognition processing (S203), and the video signal separation determination processing (S201). The second control unit 21 further determines a delay time required for the image processing. In other words, the second control unit 21 sets a delay time associated with each image processing. In step S206, the second control unit 21 sets the determined image processing to the image processing unit 25. In step S207, the second control unit 21 transmits delay time information concerning the delay time to the first control unit 13. In step S208, the image processing unit 25 performs image processing appropriate to the type of video signal that the user is viewing, the type of device, and the setting input by the user. In step S209, the display unit 26 displays a video image processed as described above.

The delay time information refers to the delay time between the input of the video signal and the display on the display unit 26 of the video signal, including the time for processing the video signal.

In step S104, first control unit 13 in the audio processing apparatus 1 receives the delay time information transmitted from the second control unit 21 in step S207. In step S105, the first control unit 13 sets the delay time to the delay unit 10 based on the delay time information. In step S106, the delay unit 10 delays the audio signal separated in step S103 for the period equivalent to the time set in the delay unit 10. In step S107, the amplifying unit 11 amplifies and outputs the audio signal from the speaker unit 12, which is synchronized with the video signal that the user is viewing.

An example of image processing based on the type of a device is described below. In a case where the type of device is a DVD player, the video processing apparatus 2 performs image processing supporting the cinema mode. When the type of device is a game console, the video processing apparatus 2 performs image processing supporting the game mode.

The image processing supporting the cinema mode can include 2-3 pull-down processing. Since the 2-3 pull-down processing is frame interpolation processing, the display delay time becomes long.

The image processing supporting the game mode can include intra-field interpolation processing. Shorter delay time can be achieved by skipping noise reduction processing and performing the minimum image processing required, so that the uncomfortable feeling, a use may have, due to the delay responding to the operation by the user can be minimized.

Since the video processing apparatus 2, thus, selectively executes the image processing that supports the device connected to the audio processing apparatus 1, the image processing time changes.

An example of image processing based on the type of video signal is described below. When the video signal is a progressive signal, the video processing apparatus 2 converts the resolution of the video signal into the resolution at which the display unit 26 can display a video image. When the video signal is an interlace signal, the video processing apparatus 2 converts the video signal into a progressive signal, and also converts the resolution of the video signal into the resolution at which the display unit 26 can display a video image. The above-described image processing can be replaced by other appropriate processing according to the image type, i.e., a still image or a moving image.

Since the video processing apparatus 2, thus, sets the image processing that supports the type of video signal output from the device connected to the audio processing apparatus 1, the image processing time changes.

An example of image processing based on the setting information is described below.

When a user sets the dynamic image quality, the video processing apparatus 2 executes color correction processing. When the user sets the standard image quality, the video processing apparatus 2 executes no color correction processing. Otherwise, the video processing apparatus 2 lowers the processing level. The video processing apparatus 2 may perform the image corrections, such as noise reduction or gamma correction, according to the settings made by the user. The image processing time, thus, changes according to the image quality setting made by the user.

The delay time data required from starting of the image processing to displaying of the video image is stored in a memory in the second control unit 21 as a table data as illustrated in FIG. 6. The delay time data corresponding to the type of the device, the type of the video signal, and the image quality setting made by the user is transmitted to the first control unit 13. The delay time data can be written in a register in the second control unit 21 or an external memory, so that the first control unit 13 can access thereto to obtain the delay time data. Instead of transmitting the delay time data itself the second control unit 21 may transmit any suitable information dependent on the image-processing type applied by the image processing unit 25. For example, the information supplied could be "processing type 7". The first control unit 13 can then convert this information into the required delay time, for example by using a look-up table provided in the audio processing apparatus 1 or in an external memory.

As described above, audio reproduction synchronized with video display can be performed even when the image processing time changes according to the type of the device, the type of the video signal, and the image quality setting made by the user.

Second Exemplary Embodiment

Figure 2:
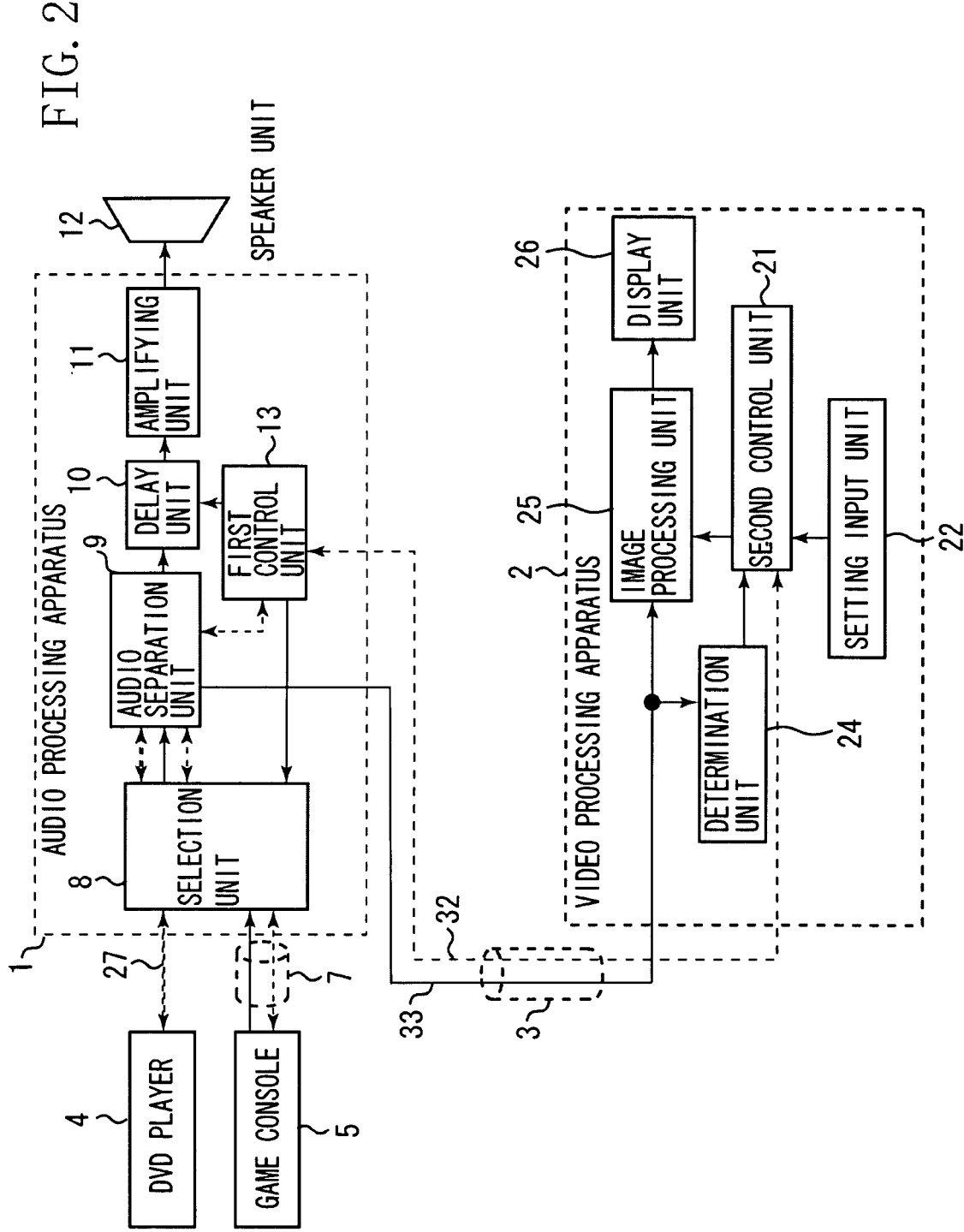
FIG. 2 is a block diagram illustrating an audio processing apparatus and a video processing apparatus according to a second exemplary embodiment of the present invention.

FIG. 2 is a block diagram illustrating an audio processing apparatus 1 and a video processing apparatus 2 according to a second exemplary embodiment of the present invention.

The difference from the first exemplary embodiment lies in the point that a multiplexing signal line 27 is used as the second interface cable connecting the audio processing apparatus 1 with the first video audio output device 4. The multiplexing signal line 27 transmits a time-division multiplex signal composed of a video signal, an audio signal, and a control signal. The audio separation unit 9 in the audio processing apparatus 1 separates the output signal from the selection unit 8 into the audio signal, the video signal and the control signal and outputs them. The video signal separated by the audio separation unit 9 is output to the image processing unit 25 and the determination unit 24 via the video signal line 33, and the determination unit 24 determines the type of the video signal. The control signal is transmitted from the first control unit 13 to the second control unit 21 in the video processing apparatus 2. Other processing is similar to that in the first exemplary embodiment.

As described above, audio reproduction synchronized with video display can be performed even when the video separation unit 23 in the first exemplary embodiment is omitted and many types of the input interface in the audio processing apparatus 1 are used.

Third Exemplary Embodiment

Figure 3:
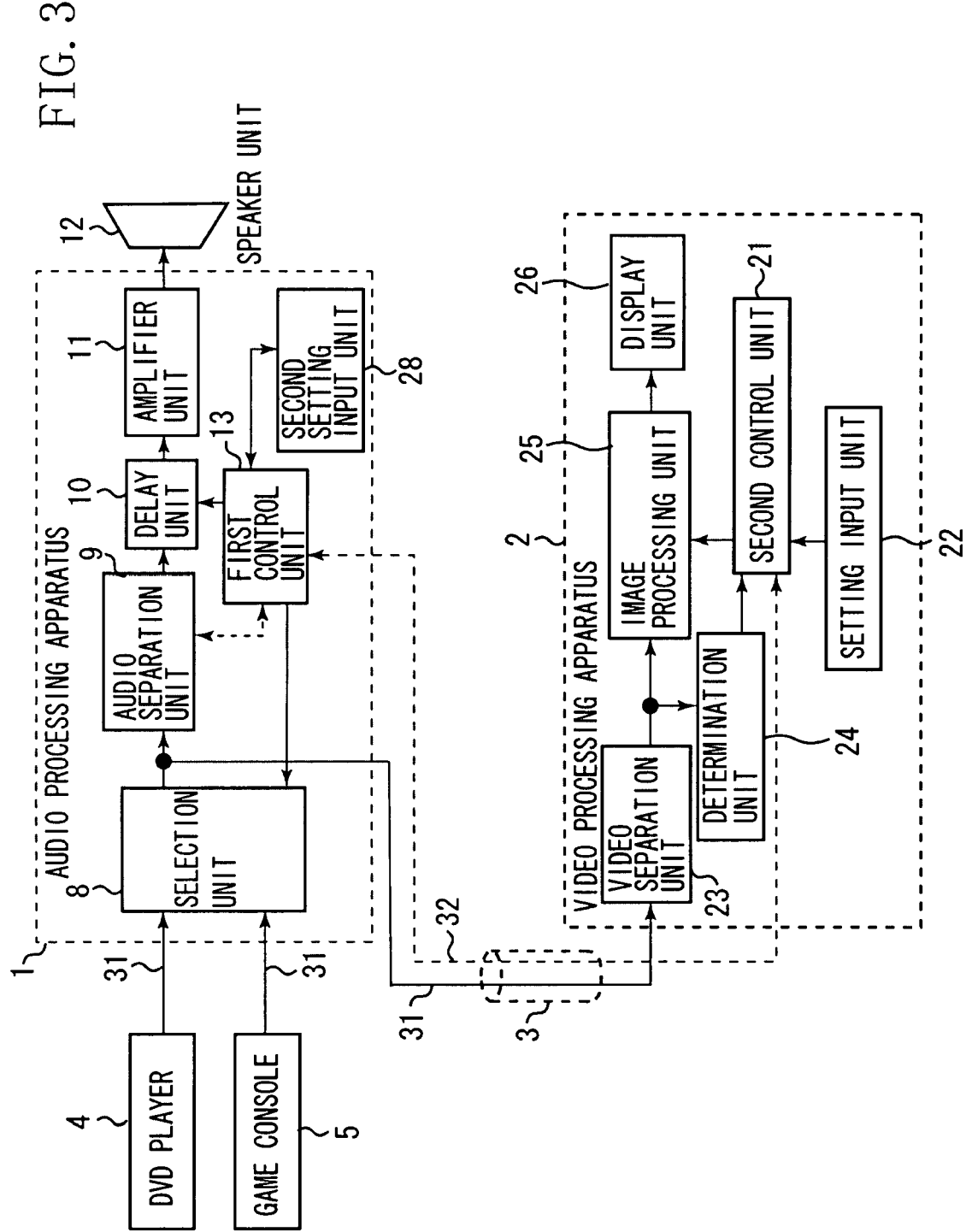
FIG. 3 is a block diagram illustrating an audio processing apparatus and a video processing apparatus according to a third exemplary embodiment of the present invention.

FIG. 3 is a block diagram illustrating a audio processing apparatus 1 and a video processing apparatus 2 according to a third exemplary embodiment of the present invention. The difference from the other exemplary embodiments lies in the point that the second and the third interface cables connecting the audio processing apparatus 1 with the first video audio output device 4 and the second video audio output apparatus 5, respectively, are each replaced by a video audio signal line 31. A further point of difference is that the audio processing apparatus 1 further includes a second setting input unit 28. A user can input the type of a device via the second setting input unit 28.

The user can input and define, via the second setting input unit 28, the type information about an input device to be selected by the selection unit 8. The first control unit 13 stores the information about the device selected by the selection unit 8 and transmits the information to the second control unit 21 in the video processing apparatus 2. Other processing is similar to that in the first exemplary embodiment.

As described above, audio reproduction synchronized with video display can be performed even when the audio processing apparatus 1 uses no control signal line for input interface.

Fourth Exemplary Embodiment

Figure 4:
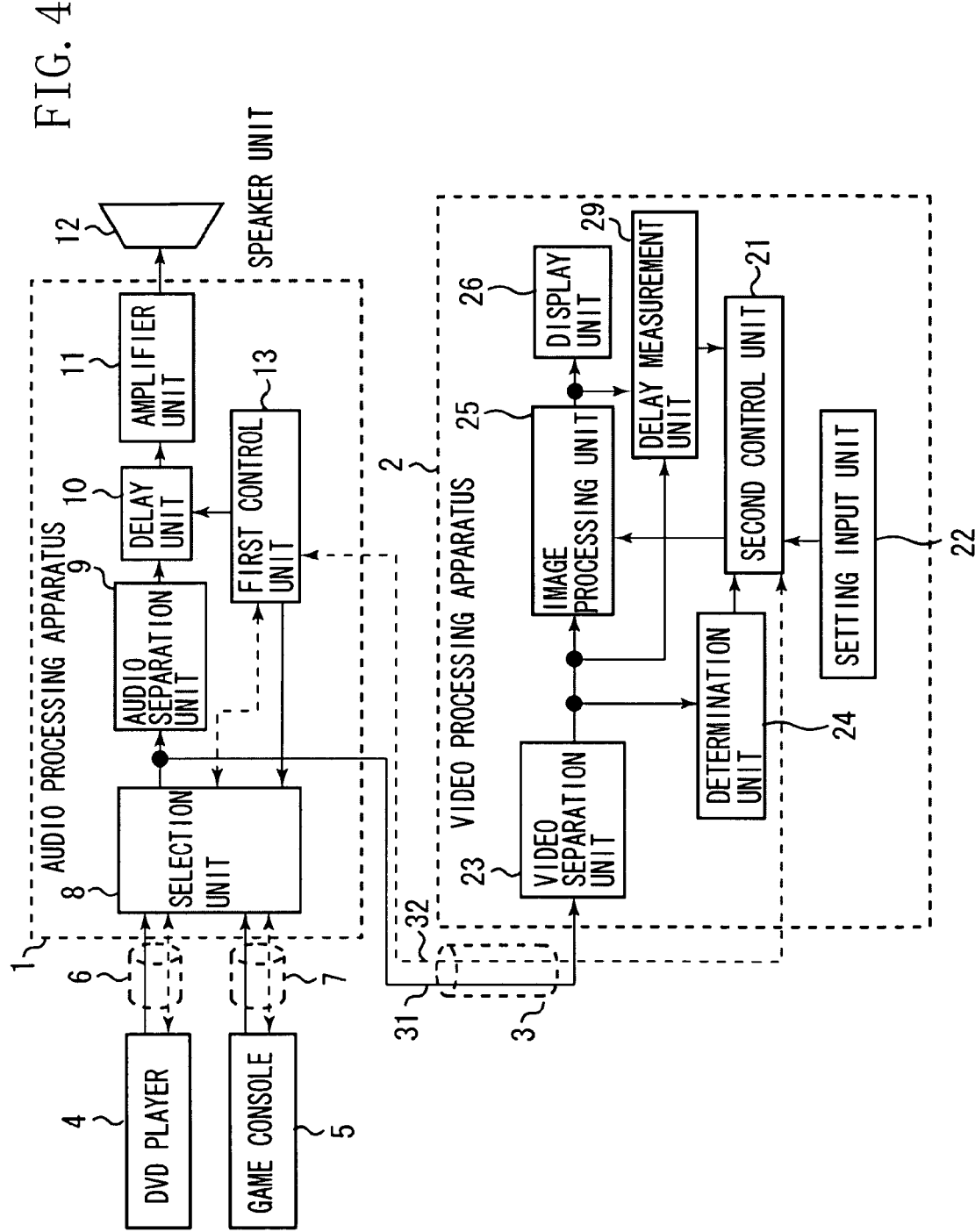
FIG. 4 is a block diagram illustrating an audio processing apparatus and a video processing apparatus according to a fourth exemplary embodiment of the present invention.

FIG. 4 is a block diagram illustrating an audio processing apparatus 1 and a video processing apparatus 2 according to a fourth exemplary embodiment of the present invention. The difference from the other exemplary embodiments lies in the point that the video processing apparatus 2 further includes a delay measurement unit 29. The delay measurement unit 29 compares the input signal and the output signal of the image processing unit 25, and measures a delay time between the input signal and the output signal. Consequently, the delay measurement unit 29 outputs the delay time to the second control unit 21.

The delay measurement unit 29 detects frame number information multiplexed with a video signal and scene changes caused by a luminance change based on the input and output video signals of the image processing unit 25 to measure the delay time between the input signal and the output signal. The second control unit 21 sums up a stored response time of the display unit 26 and the delay time between the input signal and the output signal, which is input from the delay measurement unit 29, and transmits the total value to the first control unit 13 as delay time information. Other processing is similar to that in the first exemplary embodiment.

As described above, audio reproduction synchronized with video display can be performed even when the input video signal is analyzed in the image processing unit 25 and image processing is dynamically changed according to the analyzed result.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-306003 filed Nov. 27, 2007, which is hereby incorporated by reference herein in its entirety.

What is claimed is:

1. An audio processing apparatus connected to a video processing apparatus and connected to a plurality of input source devices, the audio processing apparatus comprising:
   a selection unit configured to select an input source device from the plurality of input source devices;
   a transmission unit configured to transmit a device type of the selected input source device to the video processing apparatus;
   a receiving unit configured to receive delay time information from the video processing apparatus concerning display of a video based on a video signal output from the selected input source device, the delay time information being set according to the device type of the selected input source device; and
   a delay unit configured to delay an audio signal input from the selected input source device based on the delay time information.

2. The audio processing apparatus according to claim 1, wherein said device type information includes at least information indicating a digital versatile disc (DVD) player and a game console.

3. A video processing apparatus connected to an audio processing apparatus and capable of processing audio signals input, through the audio processing apparatus, from a plurality of input source devices connected to the audio processing apparatus, the video processing apparatus comprising:
   a determination unit configured to determine (1) a device type of the input source device selected by the audio processing apparatus and (2) a video type of a video signal input from the selected input source device;
   an image processing unit configured to execute image processing of the video signal based on (1) the determined device type of the selected input source device and (2) the determined video type of the video signal input from the selected input source device and (3) image quality setting information designated by a user;
   a setting unit configured to set a delay time associated with the image processing based on (1) the determined device type of the selected input source device and (2) the determined video type of the video signal input from the selected input source device and (3) image quality setting information designated by a user; and
   a transmission unit configured to transmit delay time information concerning the delay time to the audio processing apparatus.

4. The video processing apparatus according to claim 3, wherein said device type information includes at least information indicating a digital versatile disc (DVD) player and a game console,
   and wherein the setting unit sets longer delay time when the device type of the input source device is the digital versatile disc (DVD) player, and sets shorter delay time when the device type of the input source device is the game console.

5. The audio processing apparatus according to claim 3, wherein the image processing includes at least one of frame interpolation processing, intra-field interpolation processing, interlace to progressive conversion processing, color correction processing, noise reduction processing, and gamma correction processing, and
   wherein the setting unit sets different delay time corresponding to the image processing.

6. A method for controlling an audio processing apparatus connected to a video processing apparatus and connected to a plurality of input source devices, the method comprising:
   selecting an input source device from the plurality of input source devices;
   transmitting a device type of the selected input source device to the video processing apparatus;
   receiving delay time information, from the video processing apparatus, concerning display of a video based on a video signal input from the selected input source device, the delay time information being set according to the device type of the selected input source device; and
   delaying an audio signal input from the selected input source device based on the delay time information.

7. A method for controlling a video processing apparatus connected to an audio processing apparatus and capable of processing audio signals input, through the audio processing apparatus, from a plurality of input source devices connected to the audio processing apparatus, the method comprising:
   determining (1) a device type of the input source device selected by the audio processing apparatus and (2) a video type of a video signal input from the selected input source device;
   executing image processing of the video signal based on (1) the determined device type of the selected input source device and (2) the determined video type of the video signal input from the selected input source device and (3) image quality setting information designated by a user;
   setting a delay time associated with the image processing based on (1) the determined device type of the selected input source device and (2) the determined video type of the video signal input from the selected input source device and (3) image quality setting information designated by a user; and
   transmitting delay time information concerning the delay time to the audio processing apparatus.

* * * * *